(12) United States Patent
Laird-McConnell et al.

(10) Patent No.: US 8,463,740 B2
(45) Date of Patent: Jun. 11, 2013

(54) SHARING FILES ON A COMPUTER THROUGH USE OF URIS

(75) Inventors: Tom Laird-McConnell, Kirkland, WA (US); Lili Cheng, Bellevue, WA (US); Cezary Marcjan, Redmond, WA (US); Matthew B. MacLaurin, Woodinville, WA (US); Steven W. Ickman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/535,695

(22) Filed: Aug. 5, 2009

(65) Prior Publication Data

US 2011/0035421 A1    Feb. 10, 2011

(51) Int. Cl.
*G06F 17/30* (2006.01)

(52) U.S. Cl.
USPC ............ 707/608; 707/628; 707/638; 707/783

(58) Field of Classification Search
CPC ................................................ G06F 17/30165
USPC ................... 707/608, 628, 638, 783
See application file for complete search history.

(56) References Cited

U.S. PATENT DOCUMENTS

| | | | | |
|---|---|---|---|---|
| 7,068,309 B2 * | 6/2006 | Toyama et al. | ............ | 348/231.5 |
| 7,660,852 B2 * | 2/2010 | Flannery et al. | ............... | 709/204 |
| 8,230,326 B2 * | 7/2012 | Albornoz et al. | ............... | 715/231 |
| 2002/0095477 A1 * | 7/2002 | Hirata et al. | .................. | 709/217 |
| 2002/0184318 A1 * | 12/2002 | Pineau | .......................... | 709/206 |
| 2003/0097410 A1 * | 5/2003 | Atkins et al. | .................. | 709/206 |
| 2003/0184583 A1 | 10/2003 | Lim | | |
| 2003/0233422 A1 * | 12/2003 | Csaszar et al. | ................ | 709/206 |
| 2006/0075036 A1 * | 4/2006 | Malik | ........................... | 709/206 |
| 2007/0282847 A1 * | 12/2007 | Gwozdz | ........................... | 707/10 |
| 2008/0052373 A1 | 2/2008 | Pousti | | |
| 2008/0229211 A1 | 9/2008 | Herberger et al. | | |
| 2008/0229302 A1 * | 9/2008 | Kufeldt et al. | ................. | 717/173 |
| 2009/0150499 A1 * | 6/2009 | Partridge et al. | .............. | 709/206 |
| 2010/0198871 A1 * | 8/2010 | Stiegler et al. | ................. | 707/783 |

OTHER PUBLICATIONS

Jim Whitehead, "WebDAV: Versatile Collaboration Multiprotocol", IIII Internet Computing, Jan./Feb. 2005, pp. 66-74.*
"Social Desktop", 2009, Microsoft Corporation, Retrieved at << http://research.microsoft.com/en-us/projects/SocialDesktop/ >>, pp. 1-2.
"Social Desktop Welcome to the Home of the Social Desktop!", Retrieved at << http://www.socialdesktop.org/ >>, pp. 1-3.
Bishop, Todd., "Microsoft's 'Social Desktop' Prototype Bridges PC and Web", Feb. 19, 2009, Retrieved at <<http://www.techflash.com/Microsofts_Social_Desktop_protoype_bridges_PC_and_Web_39875887.html >>, pp. 7.

(Continued)

*Primary Examiner* — Rehana Perveen
*Assistant Examiner* — Scott A Waldron

(57) ABSTRACT

A system described herein includes a receiver component that receives a computing event with respect to a file stored in a data repository of a personal computing device. An assignor component automatically assigns a uniform resource identifier to the file responsive to the receiver component receiving the computing event with respect to the file, wherein at least a portion of content of the file is reviewable by way of a web browser through utilization of the uniform resource identifier.

20 Claims, 11 Drawing Sheets

OTHER PUBLICATIONS

"Microsoft Social Desktop:How Desktop Can Connect to Web", Aug. 4, 2009, Retrieved at << http://readerszone.com/microsoft/microsoft-social-desktophow-desktop-can-connect-to-web.html >>, pp. 3.

"Microsoft Research Social App Marries Web, Desktop", 2009, IDG Communications, Retrieved at << https://www.techworld.com.au/article/277473/microsoft_research_social_app_marries_web_desktop >>, pp. 1-3.

Sauermann, et al., "Overview and Outlook on the Semantic Desktop", Retrieved at << http://www.dfki.uni-kl.de/~-sauermann/papers/Sauermann+2005d.pdf >>, pp. 1-18.

* cited by examiner

SHARING FILES ON A COMPUTER THROUGH USE OF URIS

BACKGROUND

Personal computers have evolved over time from relatively high-cost, low-function machines to relatively low-cost machines that can be utilized to effectuate a plurality of different tasks, including but not limited to word processing, web browsing, video editing, etc. Personal computers are conventionally designed such that a file desirably accessed by a user of the personal computer is retained on a data repository of the personal computer and is accessible by way of a local file system. A conventional mechanism for sharing documents located on a personal computer is to open the document on the personal computer, print out a physical copy of the document, and provide such physical copy to an individual with whom the document is desirably shared. If the individual has any comments or desires to make alterations to the document, the individual does so on the paper copy, and provides the paper copy back to the user of the personal computer.

Another conventional mechanism for sharing documents is to do so via email. Thus, a user of a personal computer can attach a document to an email and transmit such email to one or more individuals chosen by the user of the personal computer. A recipient of the email can open the document on a different computer, make alterations to the document, and transmit it back to the sender of the email. This mechanism of sharing documents can be problematic in that it may be difficult to ascertain a desired version of the document. For instance, if a user transmits the document to ten people, and all ten individually have comments or alterations to the document, the end result is that the user has on her email system a plurality of versions of the same document, where it may be difficult to ascertain which version is desirably accessed. Moreover, incorporating comments/revisions from multiple individuals can be cumbersome.

Yet another example mechanism for sharing documents with others is to cause the document to be uploaded to a file sharing service or social networking web site. A user can use a web browser to navigate to a particular web site and cause the document to be uploaded such that it is viewable by others. When uploading the document, however, the user must agree to terms of service of the web site that hosts the document. Furthermore, such document is typically unable to be modified by reviewers of the document.

SUMMARY

The following is a brief summary of subject matter that is described in greater detail herein. This summary is not intended to be limiting as to the scope of the claims.

Described herein are various technologies pertaining to sharing files retained on a personal computer of a user with others chosen by the user. Pursuant to an example, a file stored on the personal computing device of the user may be assigned a uniform resource identifier (URI) that is unique to the file. The file then may be accessible to other computing devices through utilization of a web browser when the web browser is provided with the URI assigned to the file. For instance, the URI can be assigned to the file a first time that the user chooses to save the file to a data repository in the personal computing device. In another example, an operating system may be configured to automatically assign URIs to a plurality of files on the personal computing device upon the operating system being installed on the personal computing device.

Furthermore, the file that corresponds to the URI may be retained on the personal computing device of the user. Thus, the personal computing device of the user can act as a virtual web server. An operating system installed on the personal computing device may be configured to automatically set up the personal computing device as the virtual web server when a URI is assigned to a file. In another example, the file or a preview thereof (e.g., an image that cannot be edited) can be automatically uploaded to a server while the original file is retained on the personal computing device of the user. Thus, others may have access to the file without having access to the personal computing device of the user.

Once the file is assigned the URI, the user of the personal computing device may choose to share the file with others. To share the file, the user can employ any suitable communications application in connection with providing the URI that is assigned to the file to other individuals. Thus, for instance, the user may transmit an email to certain contacts of the user, wherein the email includes the URI. A recipient of the email may then initiate a web browser and provide the web browser with the URI, thereby causing the web browser to navigate to the file that has been shared with the recipient. When individuals make alterations or comments to the file, such alterations or comments may be automatically synchronized from the file on the server to the file retained on the personal computing device of the user. Furthermore, alterations to the file can be retained in association with the file, such that one file may have multiple versions that are accessible to the user of the personal computing device. The user can select the file on the personal computing device and quickly navigate to a particular version of such file (e.g., a version of the file that has been commented on by a particular individual).

Other aspects will be appreciated upon reading and understanding the attached figures and description.

DETAILED DESCRIPTION

Figure 1:
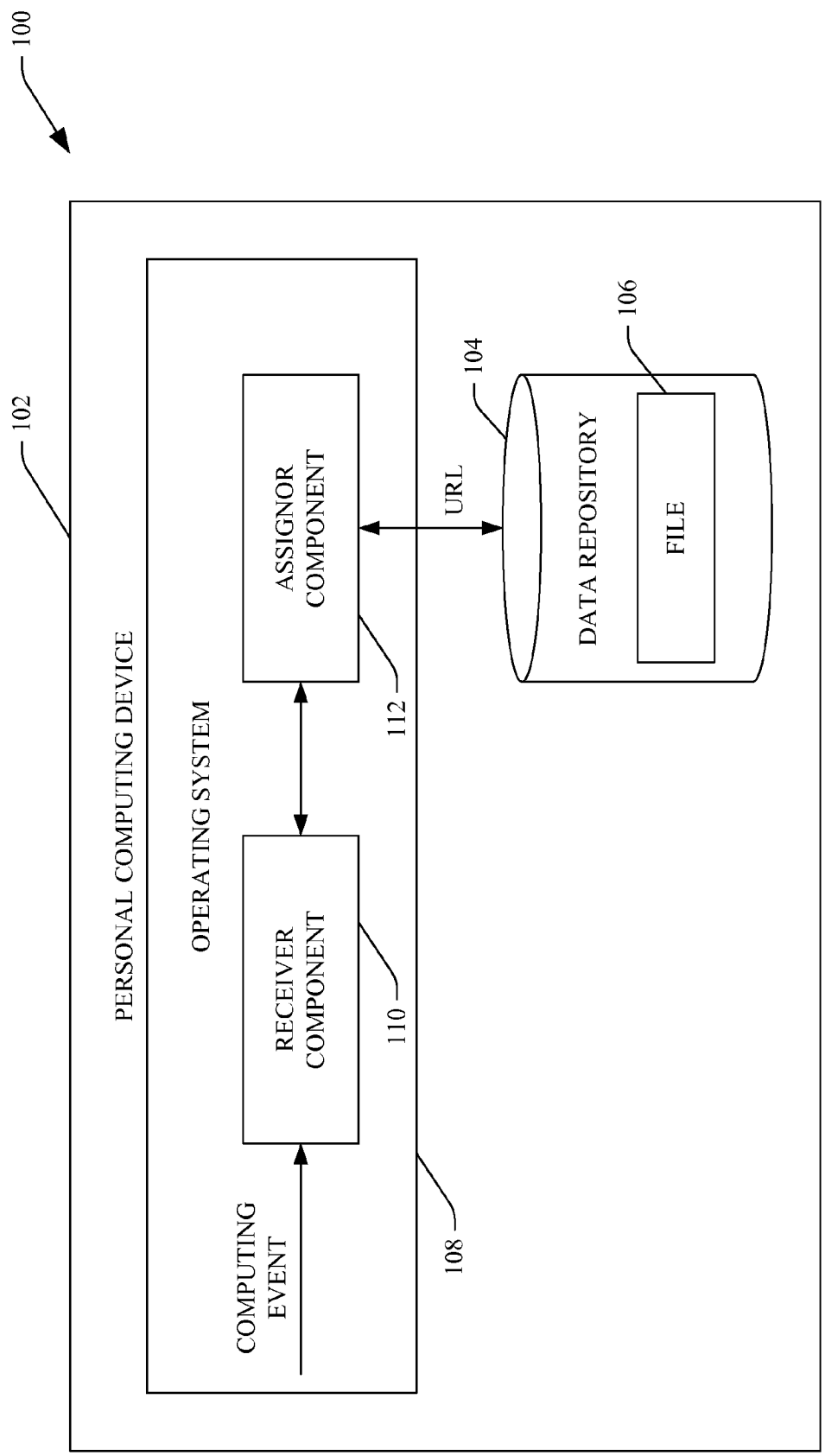
FIG. 1 is a functional block diagram of an example system that facilitates assigning a URI to a file retained on a personal computing device.

Various technologies pertaining to sharing files on a personal computing device will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates assigning a uniform resource identifier (URI) to a file is illustrated. The URI may be a Uniform Resource Locator (URL), a Uniform Resource Name (URN), or other suitable URI. The system 100 includes a personal computing device 102. The personal computing device 102 may be a desktop computer, a laptop computer, a smart phone, or other suitable personal computing device. The personal computing device 102 includes a data repository 104 that is configured to retain at least one file 106. The data repository 104 may be a hard drive, a memory, or other suitable data repository. The file 106 may be a word processing document, a spreadsheet document, a slide show presentation document, an image, a video, an audio file or other suitable file.

The personal computing device 102 additionally includes an operating system 108 that is installed on the personal computing device 102. The operating system 108 may be used in connection with controlling/monitoring processing and data storage resources on the personal computing device 102.

The system 100 additionally includes a receiver component 110 that can receive a computing event with respect to the file 106 stored in the data repository 104 of the personal computing device 102. In an example, the computing event may be a user action with respect to the file 106, such as the user causing the file to be opened, the user causing the file to be saved, or other suitable user action. In another example, the computing event may be initiated by the operating system 108 or an application executing on the personal computing device 102. For instance, the operating system 108 can be configured to select the file 106 (and other files stored in the data repository 104) when the operating system 108 is initially installed on the personal computing device 102.

An assignor component 112 can be in communication with the receiver component 110, and can automatically assign a URI to the file 106 responsive to the receiver component 110 receiving the computing event with respect to the file 106. Thus, at least a portion of content of the file 106 can be viewable by way of a web browser through utilization of the URI assigned to the file 106.

Once the URI has been assigned to the file 106, the user of the personal computing device 102 can choose to share the file 106 or contents thereof with others by transmitting the URI to selected identified individuals. For instance, the user can transmit an email to identified individuals, wherein the email includes the URI assigned to the file 106. Recipients of the email can provide the URI to a web browser and can access at least a portion of content of the file 106.

In another example, the user can choose to transmit the URI to identified individuals by way of an instant message application, by way of a web-based broadcasting application, post the URI to a social networking web site, etc. In yet another example, the URI can be transmitted directly to a computer of another user via the operating system 108 of the personal computing device 102 communicating with an operating system of another personal computing device. For instance, the operating system 108 may be configured to have knowledge of contacts of the user of the personal computing device 102, and may be configured to communicate with operating systems of other personal computing devices that are operated by the contacts of the user of the personal computing device 102. Thus, as will be described in greater detail below, an operating system of a computing device that receives the URI can be configured to provide the user thereof with a graphical icon that indicates that someone has shared a file with the user of such computing device.

In addition, as will be described in greater detail herein, once the assignor component 112 assigns the URI to the file 106, the file 106 can be retained in the data repository 104 on the personal computing device 102. The assignor component 112 can automatically configure the personal computing device 102 to be a virtual web server (e.g., the user need not take steps to configure the personal computing device 102 to act as a web server). Individuals that receive the URI then may have direct access to the file 106 in the data repository 104 on the personal computing device 102.

In another example, when the assignor component 112 assigns the URI to the file 106, a copy of the file 106 can be created and placed on a separate computing device (e.g., a web server hosted by a service provider). The URI may then direct a recipient of the URI to the copy of the file stored separately from the personal computing device 102. Therefore, users of other personal computing devices can have access to the file 106 without having access to contents of the personal computing device 102 of the user.

In still yet another example, rather than generating a copy of the file 106, a preview of the file 106 can be generated, such that the URI assigned to the file 106 points to the preview of the file 106. The preview can be an image of the file that is unable to be edited by reviewers of the preview. Reviewers of the preview of the file 106, however, may provide comments pertaining to content of the file 106. In one or more of these examples, the URI may remain static if the owner of the file 106 chooses to update the file 106 from a different computer and/or serve the file 106 from a different computer or network.

In an example implementation, the URI may point to a preview of the file 106 (a homepage of the file 106), wherein the preview/homepage for the file may include tools that facilitate receipt and display of comments, discussion, and/or annotation. The file preview/homepage may be retained in a computing cloud separate from the personal computing device 102 of the user, such that the homepage is accessible when the user of the personal computing device 102 powers down such device 102 and/or disconnects from the Internet.

While the operating system 108 is shown as including the receiver component 110 and the assignor component 112 as modules thereof, it is to be understood that the receiver component 110 and/or the assignor component 112 may be included in a separate application that executes on the personal computing device 102. For instance, the receiver component 110 and the assignor component 112 can be configured to execute in a stand-alone application that executes in connection with the operating system 108.

Figure 2:
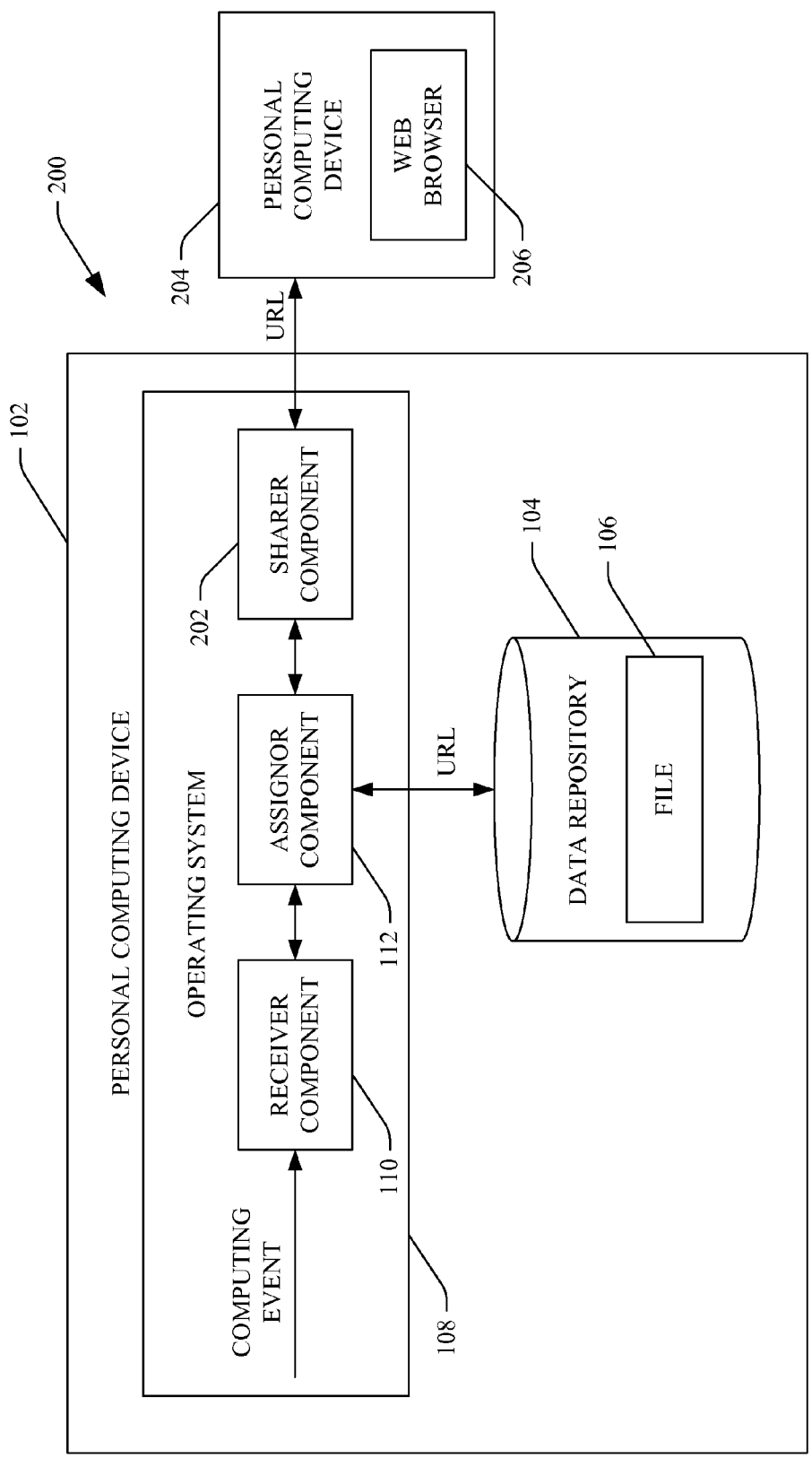
FIG. 2 is a functional block diagram of an example system that facilitates sharing a file retained on a personal computing device.

With reference now to FIG. 2, an example system 200 that facilitates sharing files is illustrated. The system 200 includes the personal computing device 102 that comprises the data repository 104 that retains the file 106. The personal computing device 102 includes the operating system 108 that controls/monitors processing resources and/or data storage resources of the personal computing device 102. As described above, the receiver component 110 receives a computing event and, responsive to receipt of the computing event, the assignor component 112 assigns a URI to the file 106, wherein the URI is unique to the file 106. It can be ascertained that the assignor component 112 can be configured to assign unique URIs to a plurality of files, wherein the files may be selected by a user, stored in a certain file folder on the personal computing device, etc.

A sharer component 202 can receive an indication from the user of the personal computing device 102 that the user of the personal computing device 102 wishes to share the file 106 or a preview thereof with at least one identified individual. In an example, the user of the personal computing device 102 can navigate a file system hierarchy and select a graphical icon that is representative of the file 106. The user may right-click on the file 106 and be provided with an option to share the file. The user may then choose to share the file by way of at least one mechanism from amongst a plurality of possible mechanisms. For instance, the sharer component 202 can be configured to initiate an application that can be utilized to transmit the URI to a personal computing device 204, wherein the personal computing device 204 is used by an individual with whom the file 106 is desirably shared. Thus, the sharer component 202 can be configured to initiate an email application and the URI can be placed in a body of an email, wherein the user of the personal computing device 204 is the intended recipient of the email. In another example, the sharer component can initiate a text messaging application, an instant messaging application, a web-based broadcasting application, or other suitable application in connection with causing the URI to be transmitted/received by the user of the personal computing device 204.

The personal computing device 204 can have a web browser 206 installed thereon. The user of the personal computing device 204 may initiate the web browser 206 and provide the web browser 206 with the URI corresponding to the file 106 (e.g., click on a hyperlink corresponding to the URI). The web browser 206 may then be utilized to access the file 106 or a preview thereof, such that the user of the personal computing device 204 can review at least a portion of the content of the file 106 through utilization of the web browser 206.

Figure 3:
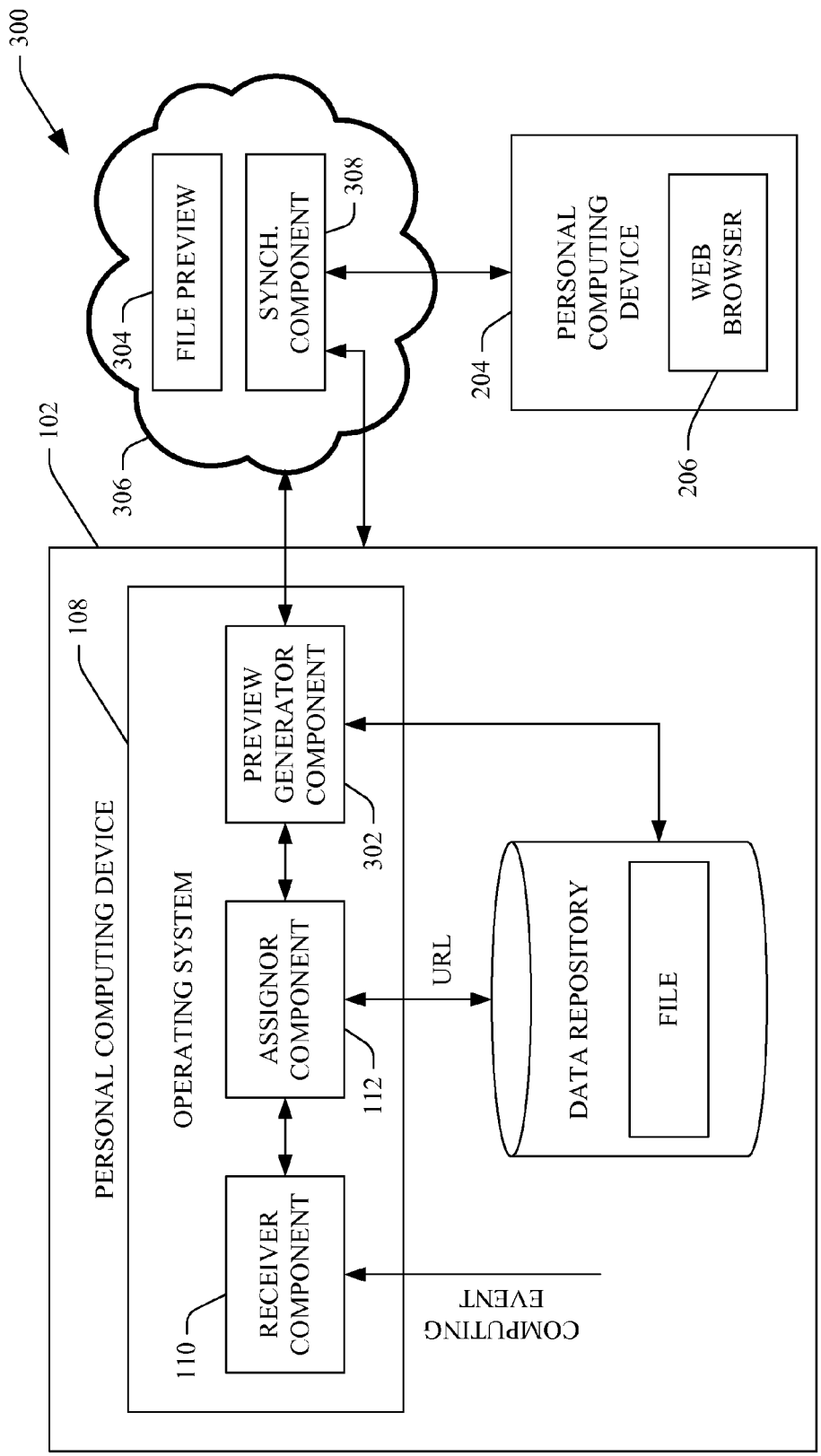
FIG. 3 is a functional block diagram of an example system that facilitates generating a preview of a file.

Referring now to FIG. 3, an example system 300 that facilitates sharing a preview of a file is illustrated. The system 300 includes the personal computing device 102, wherein the personal computing device 102 comprises the data repository 104 and the file 106 stored therein. The operating system 108 is installed on the personal computing device 102, and may comprise the receiver component 110 that receives the computing event and the assignor component 112 that automatically assigns a URI to the file 106 upon the receiver component 110 receiving the computing event. As noted above, while the receiver component 110 and the assignor component 112 are shown as residing in the operating system 108, it is to be understood that such components and other components shown in FIG. 3 may included in other applications.

A preview generator component 302 can be in communication with the assignor component 112 and can receive an indication that the file 106 has a URI assigned thereto. The preview generator component 302 may then access the data repository 104 and generate a read-only file preview 304 of the file 106. For instance, the file preview 304 may be an image of contents of at least a portion of the file 106. Furthermore, the assignor component 112 and/or the preview generator component 302 can cause the file preview 304 generated by the preview generator component 302 to be retained in a computing cloud 306 (e.g., in a web server that is separate from the personal computing device 102). Therefore, if the user of the personal computing device 102 chooses to share the file 106 with others, the file preview 304 can be accessed by others when they provide a web browser with the URI that has been assigned to the file 106. Thus, content of the file 106 can be shared with others while maintaining security with respect to the file 106 on the personal computing device 102 (e.g., those viewing the file preview 304 do not have direct access to files on the personal computing device 102).

As described above, the file preview 304 can be shared with others by transmitting a URI to a computing device used by an identified individual. For instance, an identified individual may be using the personal computing device 204 that has the web browser 206 installed thereon. The identified individual may receive the URI corresponding to the file 106 and may direct the web browser 206 to the location corresponding to the URI. The user of the personal computing device 204 may then access the file preview 304, which may be a read-only image of the file 106. The user of the personal computing device 204, however, may provide comments pertaining to the file preview 304. The user of the personal computing device 204 may suggest changes to the file 106, may provide general comments pertaining to the file 106 (e.g., "good job.") or other suitable comments.

The system 300 may also include a synchronization component 308 that can cause comments provided with respect to the file preview 304 to be stored on the personal computing device 102 in connection with the file 106 in the data repository 104. While the synchronization component 308 is shown as being retained in the computing cloud 306, it is to be understood that the synchronization component 308 may at least partially reside on the personal computing device 102 and/or the personal computing device 204.

In an example, when a reviewer of the file preview 304 generates a comment and causes such comment to be assigned to the file preview 304, the synchronization component 308 can be in communication with the personal computing device 102 and cause the comments to be stored in association with the file 106 in the data repository 104 on the personal computing device 102. The user of the personal computing device 102 can access the file 106 from the data repository 104 on the personal computing device 102 and can review the comments made by the user of the personal computing device 204 (the reviewer of the file preview 304). Furthermore, such comments may be stored in a versioned manner, such that comments made by different people may be reviewed separately with the file 106 and/or together with the file 106. That is, the user of the personal computing device 102 can access the file 106 in the data repository 104 and to review comments pertaining to a particular user or group of users.

In an example, the file preview 304 can be commented upon by individuals A, B and C, and the synchronization component 308 can cause such comments to be stored in the data repository 104 in association with the file 106. The user of the personal computing device 102 can access the file 106 and can choose to view comments made by user A only, by user B only, by user C only, comments made by any suitable combination of commenters, or may choose to review a version of the file 106 that has no comments corresponding thereto.

Furthermore, comments made by reviewers of the file preview 304 and stored in the data repository 104 (by way of the synchronization component 308) may be searchable. Thus, if a reviewer of the file preview 304 commented that contents of the file 106 were "excellent," and the user of the personal computing device 102 performed a search for the word "excellent," the search would return the file 106 (even if content of the file does not include the word "excellent").

The synchronization component 308 may be configured to cause comments to be transmitted to the personal computing device 102 substantially immediately upon a reviewer providing comments to the file preview 304. In another example, the synchronization component 308 can be configured to periodically synchronize with the personal computing device 102 such that comments from a plurality of reviewers of the file preview 304 may be synchronized at once. Furthermore, in another example, at least a portion of the synchronization component 308 may be retained on the personal computing device 102 and may ping the computing cloud 306 periodically for comments made to the file preview 304, pseudo-randomly for comments made to the file preview 304, etc. In still yet another example, the synchronization component 308 may be included on the personal computing device 204 and may transmit an indication to the computing cloud 306 that comments made to the file preview 304 should be transmitted and stored in association with the file 106.

Figure 4:
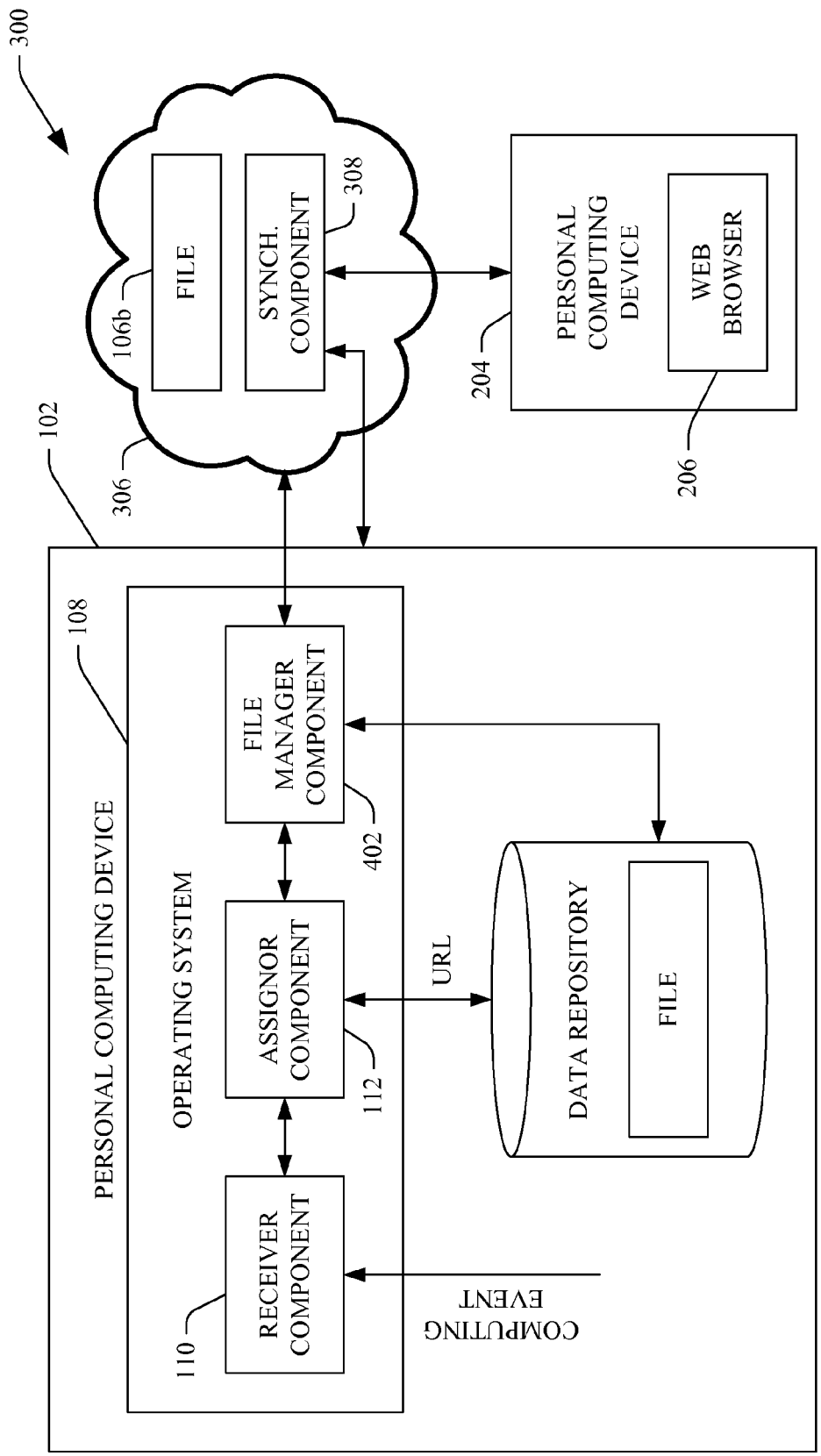
FIG. 4 is a functional block diagram of an example system that facilitates sharing a file retained on a personal computing device.

While the file preview 304 is shown as residing in the computing cloud 306, it is to be understood that the assignor component 112 can be configured to cause the personal computing device 102 to act as a virtual web server. Thus the preview generator component 302 can generate the file preview 304 such that it is retained on the personal computing device 102. For instance, the preview generator component 302 can cause the file preview 304 to be stored in a data repository on the personal computing device 102 that is logically separated from other portions of a data repository that may maintain private information. In the examples provided herein, the user of the personal computing device 102 may have control over how files are shared and security pertaining thereto (e.g., where the file 106 or file preview 304 is to be stored, whether a password is needed to access the file 106 or file preview 304, Turning now to FIG. 4, an example system 400 that facilitates sharing a file is illustrated. The system 400 includes the personal computing device 102 that comprises the data repository 104 and the file 106 retained thereon. The operating system 108 is installed on the personal computing device 102, and optionally includes the receiver component 110 and the assignor component 112, which act in conjunction to assign a URI to the file 106 as described above.

The system 400 further includes a file manager component 402 that can cause a copy of the file 106b to be stored in the computing cloud 306 such that when the user of the personal computing device 204 provides the web browser 206 with the URI, the user of the personal computing device 204 can access the copy of the file 106b. In an example, the user of the personal computing device 102 may wish to share the file 106 with the user of the personal computing device 204, wherein it is desirable that the user of the personal computing device 204 can edit the file 106. The user of the personal computing device 102 can cause the URI assigned to the file 106 to be transmitted to the user of the personal computing device 204. The user of the personal computing device 204 may provide the URI to the web browser 206, and then may access the copy of the file 106b retained in the computing cloud 306.

Once the user of the personal computing device 204 accesses the file 106b, the user of the personal computing device 204 may edit and cause alterations to be saved to the copy of the file 106b. In an example, WebDAV may be used in connection with allowing users to edit the copy of the file 106b retained in the computing cloud 306. Pursuant to an example, the user of the personal computing device 204 may access the copy of the file 106b, which causes a lock to be placed on such file 106b (e.g., other users may not access the file to edit such copy of the file 106b). The copy of the file 106b may be automatically transmitted to the personal computing device 204, such that the user of the personal computing device 204 can modify the copy of the file 106b. When the user of the personal computing device 204 saves the copy of the file 106b retained on the personal computing device 204, such alterations can be automatically uploaded to the computing cloud 306, such that the copy of the file 106b is updated. When the user of the personal computing device 204 closes the copy of the file on the personal computing device 204, the lock on the copy of the file 106b in the computing cloud 306 can be removed, such that others can access the copy of the file 106b to edit the copy of the file 106b.

The synchronization component 308 can act as described above in connection with synchronizing the copy of the file 106b with the file 106. Thus, when changes are made to the copy of the file 106b, the synchronization component 308 can cause such changes to be stored in a data repository 104 in association with file 106. As indicated above, the changes to the file 106 may be stored in association with the file 106 such that content in the file 106 generated by the user of the personal computing device 102 is not overwritten by changes made to the copy of the file 106b by other individuals. Modifications to the copy of the file 106b can be saved as versions of the file 106 in the data repository 104 of the personal computing device 102. Accordingly, when the user of the personal computing device 102 accesses the file 106, the user of the personal computing device 102 can choose whether to access the original version of the file 106, a version of the file 106 modified by a particular reviewer or set of reviewers with whom the file 106 has been shared, etc.

Furthermore, the user of the personal computing device 102 may choose to accept or modify edits made by reviewers to the copy of the file 106b, which may then update the file 106 and correspondingly update the copy of the file 106b stored in the computing cloud 306. The synchronization component 308 can manage synchronization of the file 106 when changes are made thereto. Additionally, when the user of the personal computing device 102 updates content of the file 106, such update can be automatically reflected in the copy of the file 106b retained in the computing cloud 306. In another example, when the user of the personal computing device 102 updates the file 106, such updates are not reflected to those with whom the file 106 has been shared until the user of the personal computing device 102 indicates that such updates should be reflected in the copy of the file 106b stored in the computing cloud 306.

Similarly to what has been described above, the file 106 and/or the copy of the file 106b managed by the file manager component 402 may be retained on the personal computing device 102, in the computing cloud 306, or on some other computing device. Precisely where the file 106 and/or copy of the file 106b is located, where reviewers are directed when using the URI assigned to the file 106, may be entirely up to the individual that is choosing to share the file 106.

Moreover, as described above with the preview of the file, edits made to the file 106 by reviewers of the file may be independently searchable while being stored in association with the file 106. Thus, if a reviewer of the file 106 made edits to the file 106 that were not included in the original version of the file generated by the user of the personal computing device 102, such edits may be independently searchable such that when the user of the personal computing device 102 executes a search corresponding to the edits, a version of the file 106 pertaining to such edits may be provided to the user of the personal computing device 102.

Figure 5:
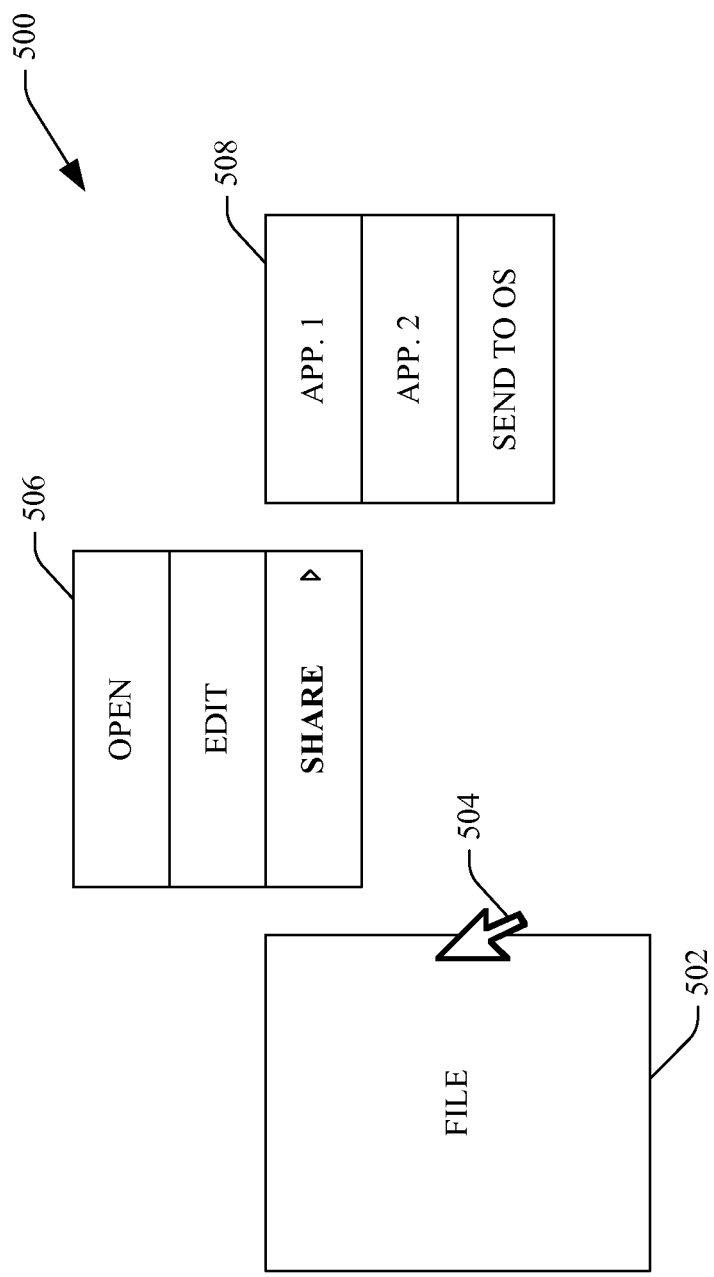
FIG. 5 is an example graphical user interface that can be utilized in connection with sharing a file with others.

Referring now to FIG. 5, an example graphical user interface 500 that facilitates sharing a file with one of more individuals is illustrated. The graphical user interface 500 includes a graphical icon 502 that is representative of a file. A user may employ a pointing and clicking device 504 to select the graphical icon 502. For instance, the pointing and clicking device 504 may be a mouse, and the mouse can be used to right-clicked on the graphical icon 502. In another example, voice commands, a touch-sensitive screen and stylus, or other suitable mechanism for selecting the graphical icon 502 may be employed.

Upon selecting the graphical icon 502 (e.g., right-clicking on the graphical icon 502), a graphical icon 506 that lists a plurality of selectable options can be displayed. For instance, it may include an option to open a file, to edit the name of a file, etc. The options displayed in the graphical icon 506 may also include an option to share the file. Pursuant to an example, by hovering over the option to share the file, a graphical icon 508 can be displayed, wherein the graphical icon 508 presents a plurality of selectable choices pertaining to a manner in which the file can be shared with others. For instance, the graphical icon 508 can include an option to share the file by way of a first application, by way of a second application, an/or by transmitting directly to an operating system of an identified individual. The applications may include emails, text messages, instant messages, broadcast, etc. Once a mechanism for sharing the file has been chosen, a URI that has been assigned to the file can be transmitted by the way of the selected application(s), such that another individual can access the file or a preview thereof.

Figure 6:
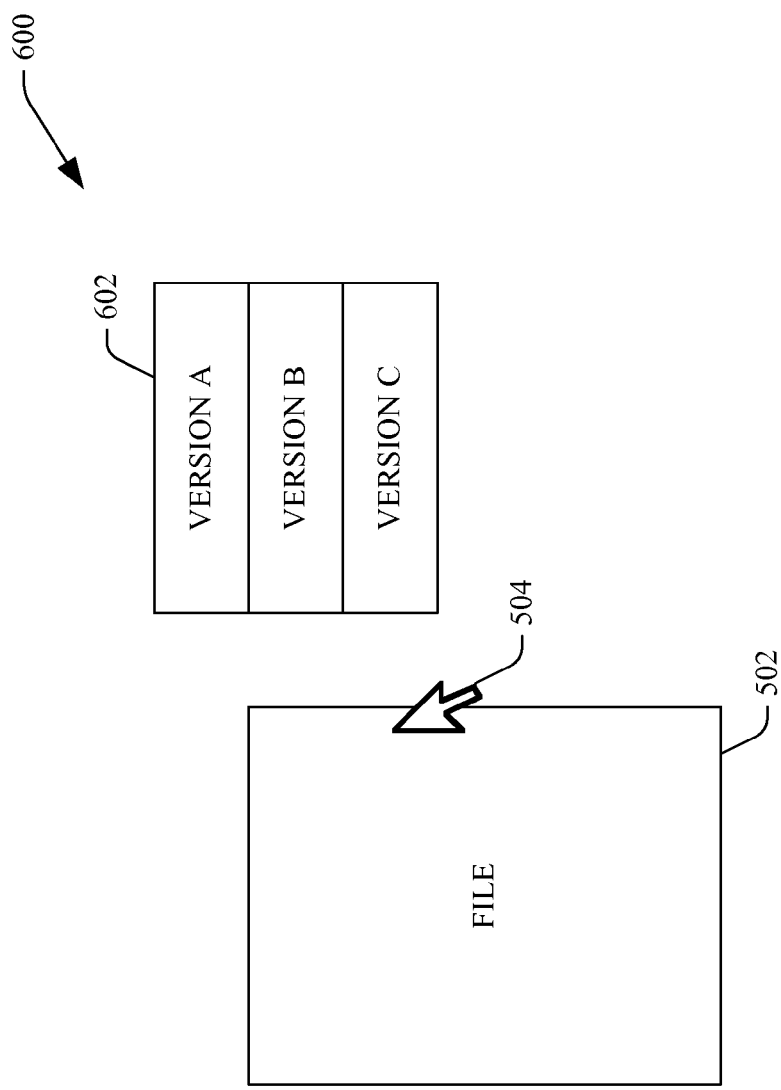
FIG. 6 is an example graphical user interface that facilitates selecting a version of a file.

With reference now to FIG. 6, an example graphical user interface 600 that can be utilized in connection with reviewing edits made to a file is illustrated. The graphical user interface 600 comprises the graphical icon 502 that is representative of the file. The user may select the graphical icon 502 by utilization of the pointing and clicking device 504 as described above, or other suitable mechanism. For instance, when the user right-clicks on the graphical icon 502, a plurality of selectable versions of the file can be shown in a graphical icon 602. Pursuant to an example, three individuals may have made updates to the file when such file was shared with the three individuals (individual A, individual B, and individual C). Thus, there may be three separate versions of the file. The graphical icon 602 may include details pertaining to each of the versions, such as who edited the file pertaining to a certain version, the time that the edit was made, a summary of edits included in the version, amongst other information. The user may utilize the pointing and clicking device 504 or other suitable mechanism to select a desired version of the file. This version may then be presented to the user on the display screen of a computing device. Additionally, the user may choose to delete certain versions, accept certain versions as being a final version of the file, etc.

Figure 7:
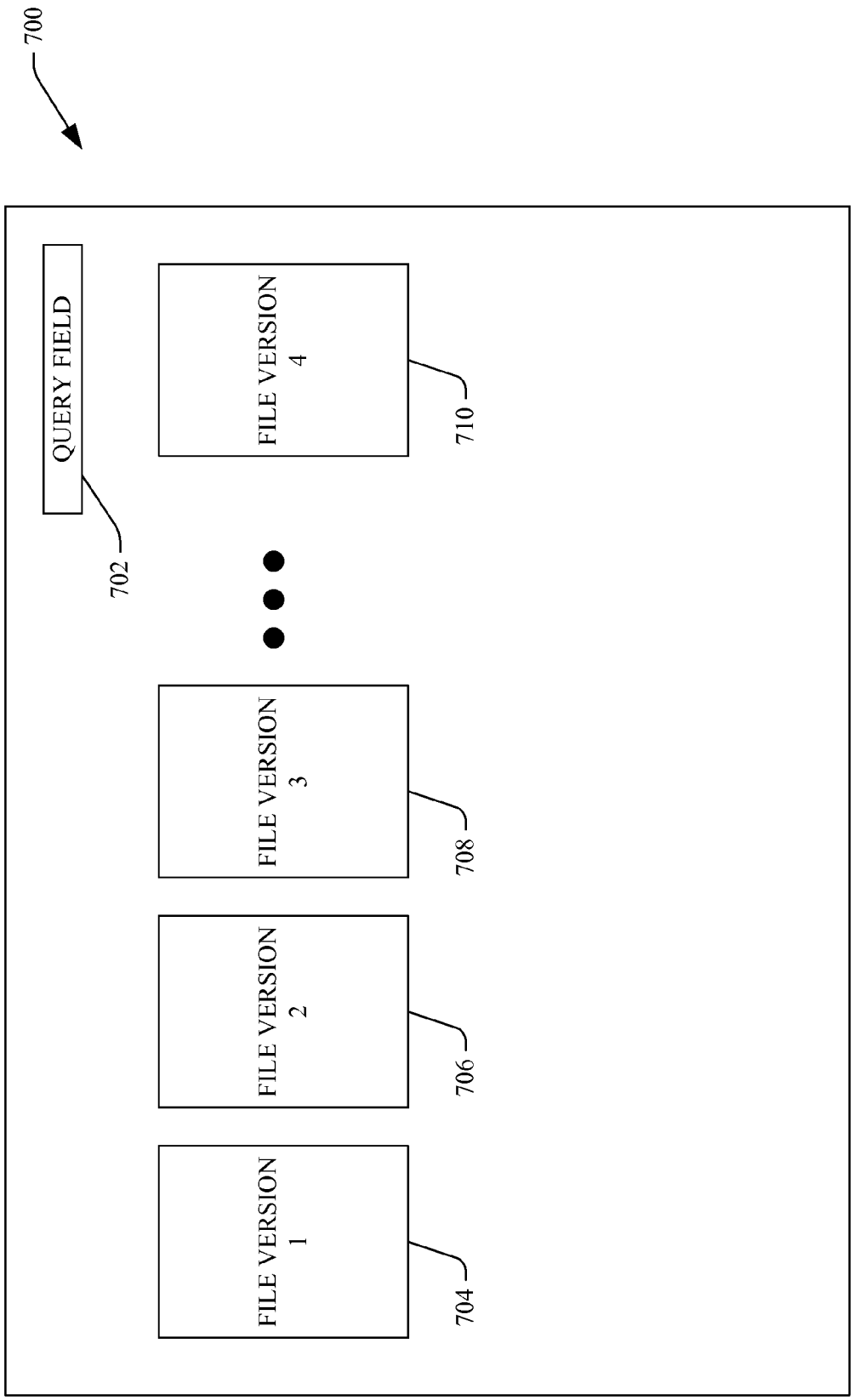
FIG. 7 is an example graphical user interface that facilitates searching for a particular version of a file.

With reference now to FIG. 7, an example graphical user interface 700 pertaining to searching over one or more files is illustrated. The graphical user interface 700 includes a query field 702, wherein a user can enter a query in the query field and cause such query to be executed by a search tool (e.g., a desktop search tool). Responsive to executing the query, the search tool may locate a plurality of files. In this example, the search results include multiple versions 704-710 of a single file correspond to the query entered into the query field 702. For instance, the file may have been subject to sharing with multiple users, and such users may have made edits to the file. While original content of the file may not have corresponded to the query entered into the query field 702, versions of such file edited by other users may correspond to the query. The search tool can return versions of such file, as well as a most recent parent version of the file. For example, the first version of the file 704 may include an edit that corresponds to the query field 702 and a summary of such file can be displayed to the user. Thus, when executing a search, the user may quickly ascertain which version of the file corresponds to which reviewer, what revisions were made to the file, amongst other data.

Figure 8:
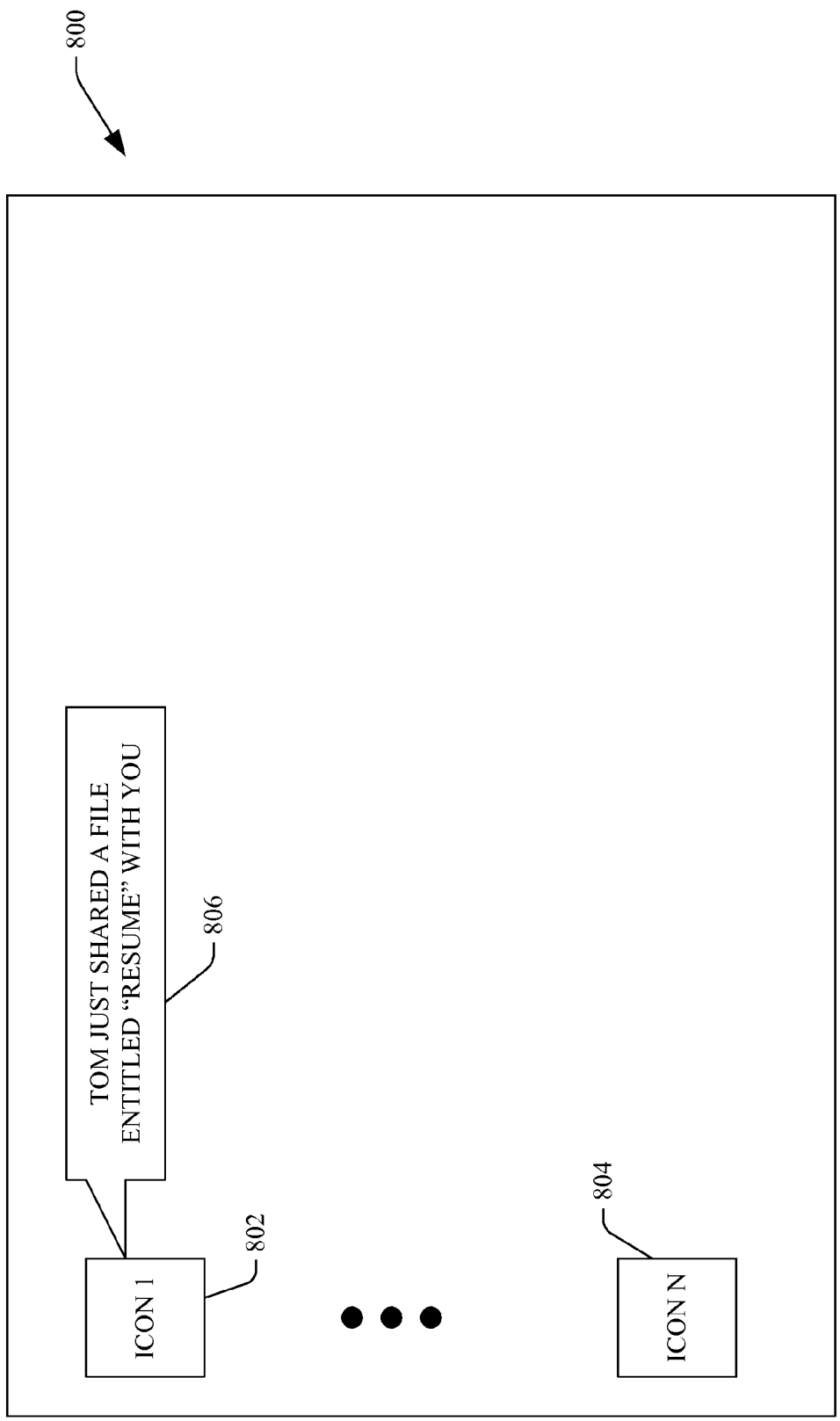
FIG. 8 is an example graphical user interface that facilitates informing an individual that someone has shared a file with such individual.

With reference now to FIG. 8, an example graphical user interface 800 that facilitates informing a user that another individual has chosen to share a file with such user is illustrated. The graphical user interface 800 may correspond to a desktop screen displayed on a personal computer. The graphical user interface 800 may include a plurality of graphical icons 802-804. The graphical icons may be avatars or other suitable icons that can represent contacts of a user of the personal computing device. As described above, a file can be shared directly to an operating system of a computing device (e.g., instead of by way of a separate application such as an email application). In this example, when an individual chooses to share a file with the user of the computing device corresponding to the graphical user interface 800, a graphical indicia 806 can be provided to indicate that a file has been shared with such user. This indicia may be in the form of text, an icon, animation, etc. By selecting the icon 802, the user of the personal computing device can cause a folder to be opened that includes representations of files that have been shared by an individual corresponding to the icon 802 with the user. Accordingly, in this example, a file hierarchy can be arranged around who has shared documents with the user of the personal computing device.

Figure 9:
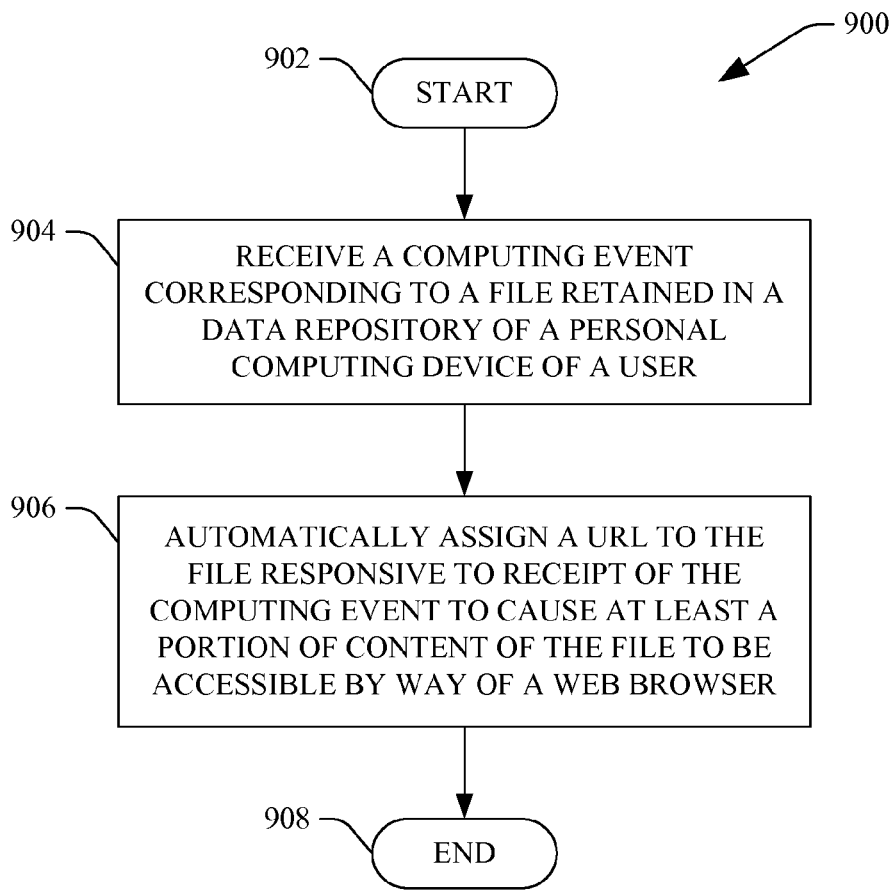
FIG. 9 is a flow diagram that illustrates an example methodology for automatically assigning a URI to a file retained on a personal computing device of a user.
Figure 10:
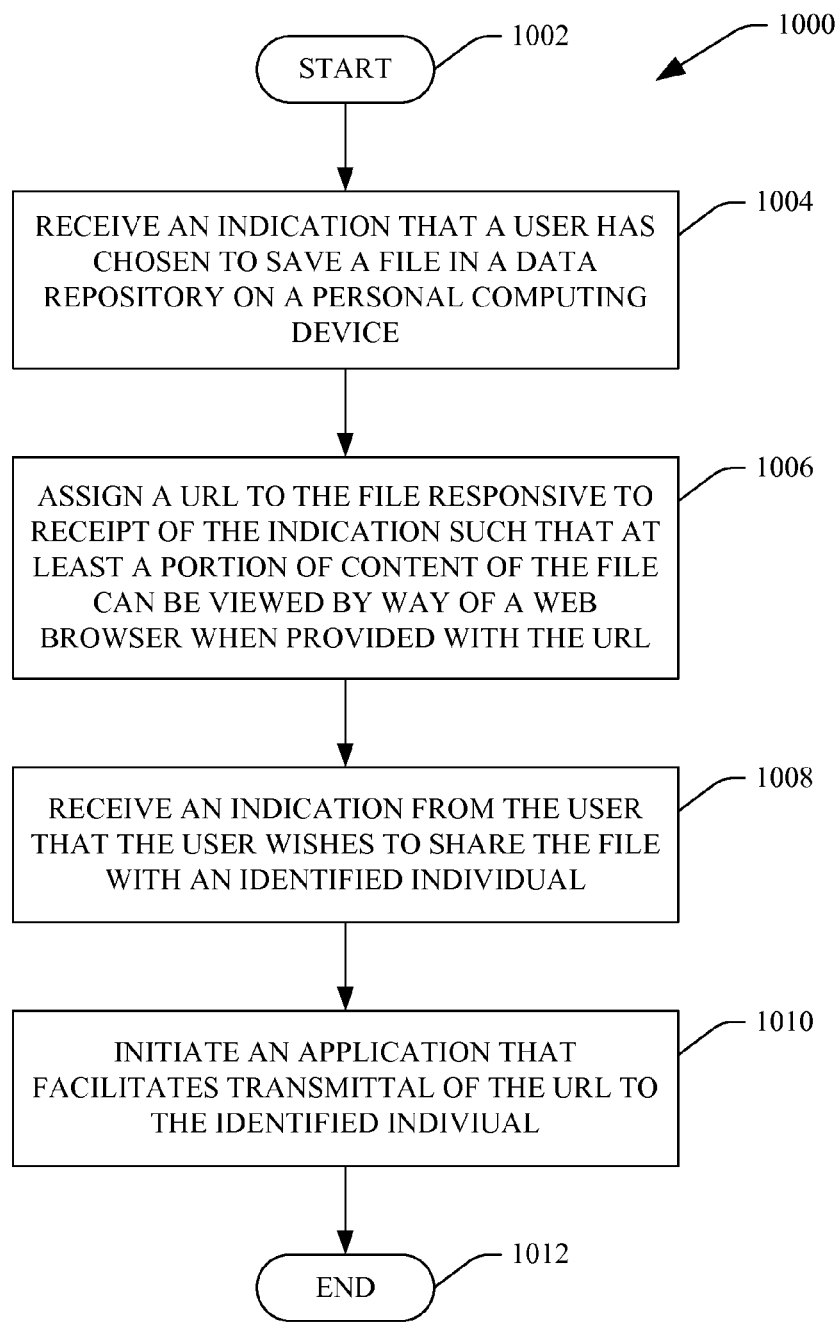
FIG. 10 is a flow diagram that illustrates an example methodology for sharing a file.

With reference now to FIGS. 9-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 9, a methodology 900 that facilitates automatically assigning a URI to a file is illustrated. For instance, the methodology 900 can be configured for execution on an operating system of a personal computing device. The methodology 900 begins at 902, and at 904 a computing event corresponding to a file retained in a data repository of a personal computing device of a user is received via a processor. For instance, the computing event may be a selection of a file by the user, a selection of the file in an automated fashion by a computing component (e.g., an operating system), saving a file, etc. For example, the file may be one of a word processing document, an image, a video, a spreadsheet, or a slide show presentation, amongst other types of files.

At 906, a URI is automatically assigned to the file responsive to the receipt of the computing event to cause at least a portion of the content of the file to be acceptable by way of a web browser. For instance, once the URI is assigned to the file, a preview of the file can be generated and stored on a web server. In another example, the personal computing device may be caused to act as a virtual web server, such that the URI points to the file on the personal computing device, or to a copy of the file on the personal computing device. The methodology 900 completes at 908.

Now referring to FIG. 10, a methodology 1000 that facilitates sharing a file is illustrated. The methodology 1000 starts at 1002, and at 1004 an indication is received that a user has made a selection to save a file in a date repository on a personal computing device.

At 1006, a URI is automatically assigned to the file responsive to receipt of the indication received at 1004. Thus, at least a portion of content of the file can be viewed by way of a web browser when the web browser is provided with the URI assigned to the file. For instance, a preview of the file can be generated and stored on a web server, and the URI can point to the preview of the file. In another example, a copy of the file can be stored on the web server, and the URI can point to the copy of the file.

At 1008, an indication is received from the user that the user wishes to share the file with an identified individual. In other words, the user can issue a request to share the file with at least one identified individual. For instance, the identified individual may be a contact of the user of the personal computing device.

At 1010, an application is initiated that facilitates transmittal of the URI to the identified individual. As noted above, the application can be any suitable application that can be executed on a computer. Additionally or alternatively, the user may choose to share the file by sending an indication directly to the operating system of the computing device utilized by the identified individual. The methodology 1000 completes at 1012.

Figure 11:
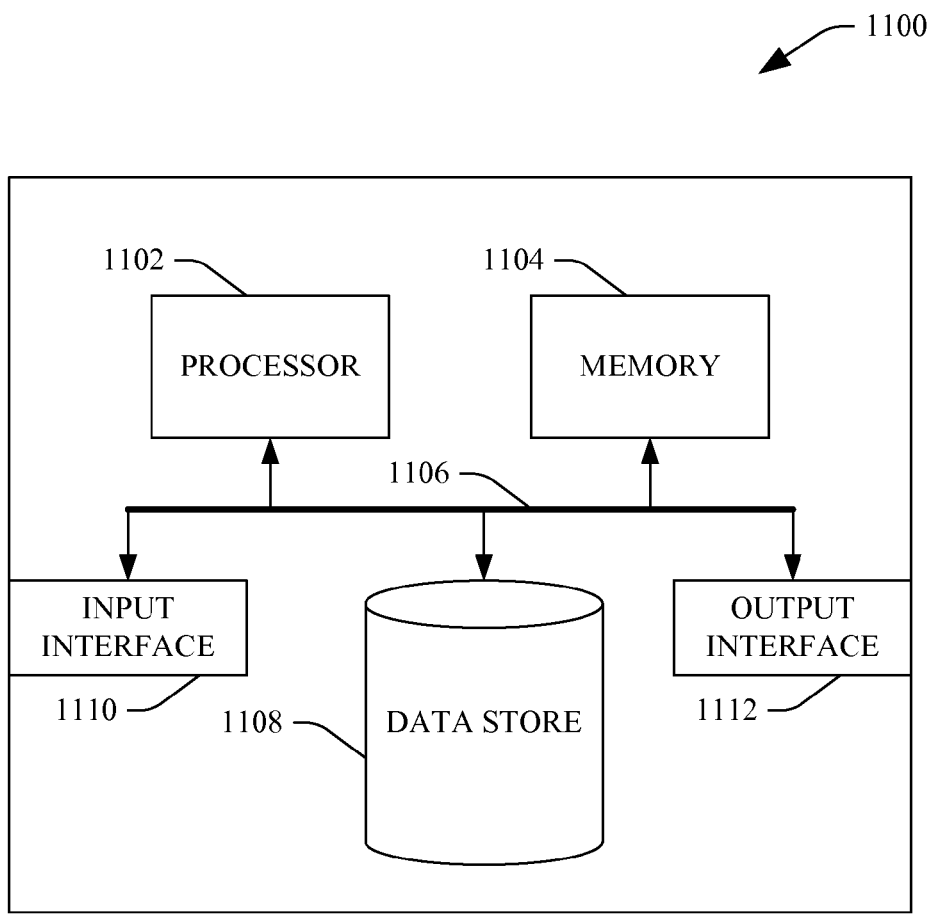
FIG. 11 is an example computing device.

Now referring FIG. 11 a high-level illustration of an example computing device 1100 that can be used in accordance with the systems and methodologies disclosed herein is illustrated. For instance, the computing device 1100 may be used in a system that supports assigning URIs to files on personal computing devices such that the files can be accessible through utilization of a web browser and the URIs. In another example, at least a portion of the computing device 1100 may be used in a system that supports sharing a file with others through transmission of the URI to others. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store files, URIs assigned to files, versions of files, comments made to files, etc.

The computing device 1100 additionally includes a data store 1108 that is accessible by the processor 1102 by way of the system bus 1106. The data store 1108 may include executable instructions, files, versions of files, URIs assigned to files, etc. The computing device 1100 also includes an input interface 1110 that allows external devices to communicate with the computing device 1100. For instance, the input interface 1110 may be used to receive instructions from an external computing device, a user, from a computing device located in a computing cloud, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising a plurality of computer-executable acts, the acts executed by a processor of a personal computing device of a user, the acts comprising:
receiving a computing event corresponding to a file retained in a data repository of the personal computing device of the user;
responsive to receiving the computing event, automatically generating a preview of contents of the file;
subsequent to generating the preview of the contents of the file, transmitting the preview to a web server for retention thereon, wherein the preview is assigned a uniform resource identifier such that the preview is accessible by way of a web browser that is provided the uniform resource identifier;
automatically transmitting first notifications to operating systems of respective computing devices of approved contacts of the user of the personal computing device, the first notifications comprising the uniform resource identifier;
receiving from the web server at least one comment on the preview, the at least one comment generated by a reviewer of the preview that accessed the preview on the web server by way of the web browser and the uniform resource identifier, the at least one comment at least temporarily retained on the web server in correlation with the preview, the reviewer being one of the approved contacts of the user of the personal computing device; and
storing the at least one comment on the preview in the data repository of the personal computing device in association with the file and responsive to receiving the at least one comment on the preview from the web server, the at least one comment being searchable on the personal computing device;
wherein the at least one comment on the preview is assigned to a version of the file in the data repository such that the version of the file corresponding to the at least one comment generated by the reviewer is provided to the user of the personal computing device when the user reviews the at least one comment generated by the reviewer.

2. The method of claim 1 configured for execution in an operating system of the personal computing device of the user.

3. The method of claim 1, further comprising:
automatically assigning another uniform resource identifier to the file on the personal computing device of the user such that the file is accessible from another computing device that directs a web browser to the uniform resource identifier assigned to the file; and automatically transmitting second notifications to the respective operating systems of the computing devices of the approved contacts of the user, the second notifications comprising the another uniform resource identifier.

4. The method of claim 1, wherein the file is one of a word processing document, an image, a video, a spreadsheet, an audio file, or a slide show presentation.

5. The method of claim 1, wherein the computing event is an operating system of the personal computing device automatically selecting the file upon the operating system being installed onto the personal computing device.

6. The method of claim 1, wherein the computing event is the user requesting the file to be saved on the personal computing device.

7. The method of claim 1, further comprising:
receiving a request from the user to share the file with at least one individual; and
initiating an application that facilitates transmittal of the uniform resource identifier to the individual.

8. The method of claim 7, wherein the application is an email application, a text messaging application, an email application, or a social networking application.

9. The method of claim 1, further comprising:
receiving a request from the user to share the file with at least one individual; and
automatically transmitting the uniform resource identifier to an operating system of the personal computing device of the at least one individual.

10. The method of claim 1, further comprising:
receiving a query that is configured to locate the file retained on the personal computing device; and
returning the file based at least in part upon the query and the at least one comment stored in association with the file.

11. The method of claim 1, further comprising:
receiving a request from the user to share the file with at least one individual;
creating a copy of the file;
assigning another uniform resource identifier to the copy of the file; and
causing the copy of the file to be stored on a-the web server, wherein the copy of the file is accessible by way of the another uniform resource identifier.

12. The method of claim 11, further comprising:
receiving revisions to the copy of the file stored on the web server; and
synchronizing the copy of the file stored on the web server with the file stored on the personal computing device of the user such that the revisions are stored in the data repository in association with the file.

13. A system, comprising:
a processor; and
a memory that comprises a plurality of components that are executed by the processor, the components comprising:
a receiver component that receives a computing event with respect to a file stored in a data repository of a personal computing device;
a preview generator component that automatically generates a preview of the contents of the file responsive to the receiver component receiving the computing event with respect to the file, the preview generator component causing the preview of the contents of the file to be stored at a web server, the preview of the contents of the file being assigned a uniform resource identifier such that the preview of the contents of the file is accessible by way of a web browser that is provided the uniform resource identifier; and
a synchronization component that causes comments generated by one or more reviewers of the preview of the contents of the file on the web server to be transmitted from data storage on the web server to the personal computing device, wherein the one or more reviewers of the preview of the contents of the file are approved contacts of a user of the personal computing device who received the uniform resource identifier automatically transmitted to an operating system of respective computing devices of the one or more reviewers, wherein the synchronization component causes the comments to be stored in association with the file in the data repository of the personal computing device, wherein the comments are searchable on the personal computing device, and wherein the comments are assigned to versions of the file in the data repository such that a version of the file corresponding to comments generated by the one or more reviewers is provided to the user of the personal computing device when reviewing the comments generated by the one or more reviewers.

14. The system of claim 13, further comprising a sharer component that receives an indication from a user of the personal computing device that the preview of the file is to be shared with an identified individual, wherein the sharer component causes the uniform resource identifier to be transmitted to the identified individual upon receipt of the indication.

15. The system of claim 13 included in an operating system on the personal computing device.

16. The system of claim 13, further comprising an assignor component that automatically assigns a first uniform resource identifier to the file responsive to the receiver component receiving the computing event with respect to the file, wherein at least a portion of content of the file is reviewable by way of a web browser through utilization of the first uniform resource identifier.

17. The system of claim 16, wherein the assignor component assigns uniform resource identifiers to respective files on the personal computing device, wherein content of each file of the files is accessible by way of a respective unique uniform resource identifier from amongst the uniform resource identifiers.

18. The system of claim 13, wherein the file is a word processing document.

19. The system of claim 13, wherein the computing event is an indication that the file is to be saved in the data repository of the personal computing device.

20. A computer-readable data store of a personal computing device of a user comprising instructions that, when executed by a processor, cause the processor to perform acts comprising:
receiving an indication that a user has selected to save a word processing document in a data repository on the personal computing device;
responsive to receiving the indication that the user has selected to save the word processing document in the data repository on the personal computing device, automatically generating a preview of the word processing document;
subsequent to generating the preview of the word processing document, transmitting the preview by way of a network to a server, the preview of the word processing document assigned a uniform resource identifier such that the preview is viewable by way of a web browser when the web browser is provided the uniform resource identifier;

automatically transmitting notifications to respective operating systems of computing devices of approved contacts of the user, the notifications comprising the uniform resource identifier;

receiving an annotation to the preview from the server, the annotation generated by a reviewer of the preview that accesses the preview on the server by way of the web browser, the annotation at least temporarily stored on the server in correlation with the preview, the reviewer being one of the approved contacts of the user of the personal computing device; and storing the annotation in association with the word processing document in the data repository on the personal computing device responsive to receiving the annotation to the preview from the server, wherein access of the word processing document on the personal computing device causes the annotation to be presented to the user, wherein the annotation is searchable on the personal computing device, and wherein the annotation is assigned to a version from amongst a plurality of available versions of the word processing document that corresponds to the preview.

* * * * *